(12) United States Patent
Zeng et al.

(10) Patent No.: US 7,809,091 B2
(45) Date of Patent: *Oct. 5, 2010

(54) METHOD AND SYSTEM FOR DECODING SINGLE ANTENNA INTERFERENCE CANCELLATION (SAIC) AND REDUNDANCY PROCESSING ADAPTATION USING FRAME PROCESS

(75) Inventors: Huaiyu (Hanks) Zeng, Red Bank, NJ (US); Jie Lai, Belle Mead, NJ (US); Yueheng Sun, Manalapan, NJ (US); Nelson Sollenberger, Farmingdale, NJ (US); Arie Heiman, Rannana (IL); Yossy Pruzanski, Ramat Gan (IL)

(73) Assignee: Broadcom Corporation, Irvine, CA (US)

( * ) Notice: Subject to any disclaimer, the term of this patent is extended or adjusted under 35 U.S.C. 154(b) by 955 days.

This patent is subject to a terminal disclaimer.

(21) Appl. No.: 11/325,751

(22) Filed: Jan. 5, 2006

(65) Prior Publication Data

US 2007/0153942 A1 Jul. 5, 2007

(51) Int. Cl.
*H04L 27/06* (2006.01)
(52) U.S. Cl. ........................ 375/341; 375/267
(58) Field of Classification Search ............... 375/265, 375/267, 341, 347
See application file for complete search history.

(56) References Cited

U.S. PATENT DOCUMENTS 7,080,009 B2 * 7/2006 Proctor et al. ............. 704/221
7,386,779 B2 * 6/2008 Ahmed et al. ............. 714/755
2005/0024956 A1 * 2/2005 Tran et al. ................ 365/200
2006/0013341 A1 * 1/2006 Suzuki ..................... 375/340
2006/0115079 A1 * 6/2006 Heiman et al. ............ 380/28
2007/0141990 A1 * 6/2007 Zeng et al. ............... 455/63.1
2008/0080363 A1 * 4/2008 Black et al. .............. 370/209

OTHER PUBLICATIONS

Mark Austin, Ph.D., Cingular Wireless, *SAIC and Synchronized Networks for Increased GSM Capacity*, 3G Americas' SAIC Working Group, Sep. 2003, pp. 1-26.

* cited by examiner

*Primary Examiner*—Emmanuel Bayard
(74) *Attorney, Agent, or Firm*—McAndrews, Held & Malloy, Ltd.

(57) ABSTRACT

Aspects of a method and system for decoding single antenna interference cancellation (SAIC) and redundancy processing adaptation using frame process are provided. A receiver may decode video, voice, and/or speech bit sequences based on a first decoding algorithm that may utilize data redundancy and that may impose physical constraints. The receiver may also decode a bit sequence based on a second decoding algorithm that utilizes SAIC. The first and second decoding algorithms may be adapted to perform in parallel and a decoded received bit sequence may be selected based on a redundancy verification parameter. The first and second decoding algorithms may also be adapted to be performed sequentially where the subsequent decoding operation may be conditioned to the initial decoding operation. Moreover, either the first or the second decoding algorithm may be selected for decoding the received bit sequence. The selection may be based on noise and/or interference measurements.

33 Claims, 13 Drawing Sheets

METHOD AND SYSTEM FOR DECODING SINGLE ANTENNA INTERFERENCE CANCELLATION (SAIC) AND REDUNDANCY PROCESSING ADAPTATION USING FRAME PROCESS

CROSS-REFERENCE TO RELATED APPLICATIONS/INCORPORATION BY REFERENCE

This patent application makes reference to, claims priority to and claims benefit from U.S. Provisional Patent Application Ser. No. 60/752,747 filed on Dec. 21, 2005.

This application makes reference to:

U.S. application Ser. No. 11/325,721 filed on Jan. 5, 2006, which issued as U.S. Pat. No. 7,643,993 on Jan. 5, 2010;

U.S. application Ser. No. 11/325,720 filed on Jan. 5, 2006;

U.S. application Ser. No. 11/325,808 filed on Jan. 5, 2006;

U.S. application Ser. No. 11/326,066 filed on Jan. 5, 2006, which issued as U.S. Pat. No. 7,587,211 on Sep. 8, 2009;

U.S. application Ser. No. 11/325,997 filed on Jan. 5, 2006, which issued as U.S. Pat. No. 7,620,013 on Nov. 17, 2009;

U.S. application Ser. No. 11/325,752 filed on Jan. 5, 2006, which issued as U.S. Pat. No. 7,522,575 on Apr. 21, 2009;

U.S. application Ser. No. 11/325,756 filed on Jan. 5, 2006, which issued as U.S. Pat. No. 7,593,368 on Sep. 22, 2009;

U.S. application Ser. No. 11/325,759 filed on Jan. 5, 2006;

U.S. application Ser. No. 11/189,509 filed on Jul. 26, 2005;

U.S. application Ser. No. 11/189,634 filed on Jul. 26, 2005;

U.S. application Ser. No. 11/150,926 filed on Jun. 13, 2005;

U.S. application Ser. No. 11/271,692 filed on Nov. 10, 2005, which issued as U.S. Pat. No. 7,529,297 on May 5, 2009;

U.S. application Ser. No. 11/150,931 filed on Jun. 13, 2005, which issued as U.S. Pat. No. 7,184,474 on Feb. 27, 2007;

U.S. application Ser. No. 11/150,957 filed on Jun. 13, 2005;

U.S. application Ser. No. 11/151,029 filed on Jun. 13, 2005, which issued as U.S. Pat. No. 7,512,199 on Mar. 31, 2009; and U.S. application Ser. No. 11/151,030 filed on Jun. 13, 2005, which issued as U.S. Pat. No. 7,535,980 on May 19, 2009.

Each of the above stated applications is hereby incorporated herein by reference in its entirety.

FIELD OF THE INVENTION

Certain embodiments of the present invention relate to signal processing in wireless communication systems. More specifically, certain embodiments relate to a method and system for decoding single antenna interference cancellation (SAIC) and redundancy processing adaptation using a frame process.

BACKGROUND OF THE INVENTION

In digital communication receiver design, improvements in performance may require extensive system modifications that may be very costly and, in some cases, may even be impractical. Determining the right approach to achieve design improvements may depend on the optimization of a receiver system to a particular modulation type and/or to the various kinds of noises that may be introduced by a transmission channel.

Noise, such as interference from neighboring cells and multipath fading, are limiting factors for wireless system performance. A historical approach to improve the performance of receivers that may require extensive system modifications is to reduce the effect of interference by using multiple antennas, often referred to as receive or antenna diversity. However, receiving signals from multiple antennas increases hardware and/or software complexity resulting in higher implementation costs. In contrast to multiple antenna approach, —the use of single antennas may, in some instances, achieve substantial co-channel interference cancellation for GSM/GPRS/EDGE system with moderate cost.

Other approach to achieve design improvements is to explore signal interdependency or redundancy of communication systems. For example, the optimization of a receiver system may be based on whether the signals being received, generally in the form of successive symbols or information bits, are interdependent. Signals received from, for example, a convolutional encoder, transmit with partial response, multipath channel, etc., may be interdependent signals, that is, signals with memory. Equalization and decoding techniques may be necessary to achieve system improvement.

Improvements in the design and implementation of optimized receivers may require modifications to the application of conventional techniques such as MLSE algorithm, the Viterbi algorithm, the MAP algorithm, and/or the application of new techniques that address interference from neighboring cells and multipath fading and the nature of the signals transmitted. Moreover, optimized receivers may also need to implement techniques that enable the reduction of signal interference without extensive and costly increases in hardware and/or software complexity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for decoding single antenna interference cancellation (SAIC) and redundancy processing adaptation using a frame process, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for decoding single antenna interference cancellation (SAIC) and redundancy processing adaptation using a frame process. Aspects of the method and system may comprise a wireless receiver that may decode video, voice, and/or speech bit sequences based on a first decoding algorithm that may utilize redundancy in the data and that may impose physical constraints. The receiver may also decode a received bit sequence based on a second decoding algorithm that utilizes SAIC. The first and second decoding algorithms may be adapted to perform in parallel and a decoded received bit sequence may be selected based on a redundancy verification parameter. The first and second decoding algorithms may also be adapted to be performed sequentially where the subsequent decoding operation may be conditioned to the initial decoding operation. Moreover, either the first or the second decoding algorithm may be selected for decoding the received bit sequence. The selection may be based on noise and/or interference measurements.

Figure 1A:
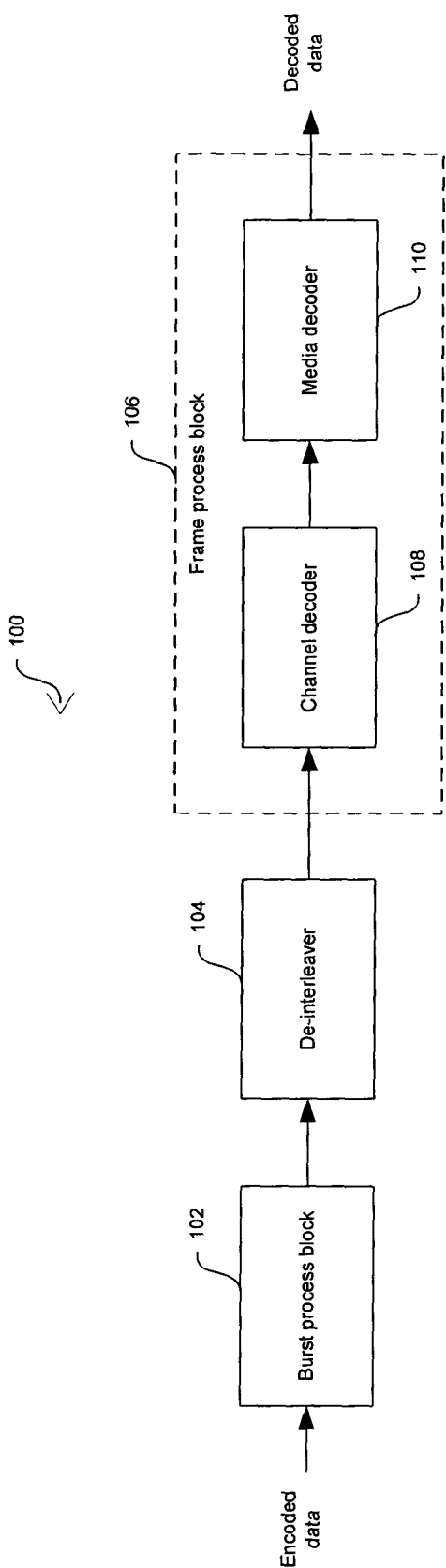
FIG. 1A is a block diagram illustrating a multilayer system for improving decoding, in accordance with an embodiment of the invention.

FIG. 1A is a block diagram illustrating a multilayer system for improving decoding, in accordance with an embodiment of the invention. Referring to FIG. 1A, there is shown a receiver 100 that comprises a burst process block 102, a de-interleaver 104, and a frame process block 106. The frame process block 106 may comprise a channel decoder 108 and a media decoder 110. The receiver 100 may comprise suitable logic, circuitry, and/or code that may enable the processing of received signals. The received signals may be, for example, interdependent signals or signals with memory. In this regard, the receiver 100 may be enabled to utilize redundancy to decode interdependent signals such as signals that comprise convolutional encoded data, for example. The decoding of interdependent signals may be referred to as redundancy-based decoding. The U.S. application Ser. No. 11/189,509 filed on Jul. 26, 2005, discloses a method and system for decoding video, voice, and/or speech data using redundancy, and is hereby incorporated herein by reference in its entirety.

Redundancy-based decoding algorithms may utilize redundancy and physical constraints embedded in video, voice, and/or speech data. For certain data formats, for example, the inherent redundancy of the physical constraints may result from the packaging of the data and the generation of a redundancy verification parameter, such as a cyclic redundancy check (CRC), for the packaged data. For speech applications, for example, physical constraints may include gain continuity and smoothness or consistency between consecutive inter-frames or intra-frames, pitch continuity in voice inter-frames or intra-frames, and/or consistency of line spectral frequency (LSF) parameters that may be utilized to represent a spectral envelope.

The receiver 100 may be enabled to perform a burst process (BP) operation and a frame process (FP) operation when processing the received signals. The receiver 100 may also be enabled to utilize a multilayer approach for improving the decoding of received signals. In this regard, results obtained in the frame process operation may be utilized to improve the performance of the burst process operation. The multilayer approach performed by the receiver 100 may be compatible with a plurality of modulation standards, for example.

The receiver 100 may also be enabled to perform single antenna interference cancellation (SAIC) algorithms when utilized in wireless applications, for example. In this regard, SAIC may refer to a technique for the cancellation of interference associated with received data communications processed by a wireless terminal within a wireless communication system. The U.S. application Ser. No. 11/150,926 filed on Jun. 13, 2005, discloses a single antenna interference cancellation within a wireless terminal, and is hereby incorporated herein by reference in its entirety.

The burst process block 102 may comprise suitable logic, circuitry, and/or code that may enable performing a burst process portion of a decoding operation of the receiver 100. In this regard, the burst process block 102 may be enabled to perform burst process operations for redundancy-based decoding and/or for SAIC operations. The burst process block 102 may comprise, for example, a channel estimation operation and a channel equalization operation. Results from the channel estimation operation may be utilized by the channel equalization operation to generate a plurality of data bursts based on a maximum-likelihood sequence estimation (MLSE) operation, for example. The output of the burst process block 102 may be transferred to the de-interleaver 104. The de-interleaver 104 may comprise suitable logic, circuitry, and/or code that may enable the multiplexing of bits from a plurality of data bursts received from the burst process block 102 to form the frame inputs to the frame process block 106. Interleaving may be utilized to reduce the effect of channel fading distortion, for example.

The channel decoder 108 may comprise suitable logic, circuitry, and/or code that may enable decoding of the bit sequences in the input frames received from the de-interleaver 104. The channel decoder 108 may be enabled to utilize the Viterbi algorithm during a Viterbi operation to improve the decoding of the input frames. The media decoder 110 may comprise suitable logic, circuitry, and/or code that may enable performing content specific processing operations on the results of the channel decoder 108 for specified applications such as MPEG-4, enhanced full-rate (EFR) or adaptive multi-rate (AMR) speech coder used in global system for mobile (GSM) communications, and/or MP3, for example. In this regard, the media decoder 110 may be enabled to support for a plurality of specified applications.

Regarding the frame process operation of the receiver 100, a standard approach for decoding convolution encoded data is to find the maximum-likelihood sequence estimate (MLSE) for a bit sequence. This may involve searching for a sequence X in which the conditional probability P(X/R) is a maximum, where X is the transmitted sequence and R is the received sequence, by using, for example, the Viterbi algorithm. In some instances, the received signal R may comprise an inherent redundancy as a result of the encoding process by the signals source. This inherent redundancy may be utilized in the decoding process by developing a MLSE algorithm that may be enabled to meet at least some of the physical constrains of the signals source. The use of physical constraints in the MLSE may be expressed as finding a maximum of the conditional probability P(X/R), where the sequence X meets a set of physical constrains C(X) and the set of physical constrains C(x) may depend on the source type and on the application. In this regard, the source type may be a voice, music and/or a video source type.

Figure 1B:
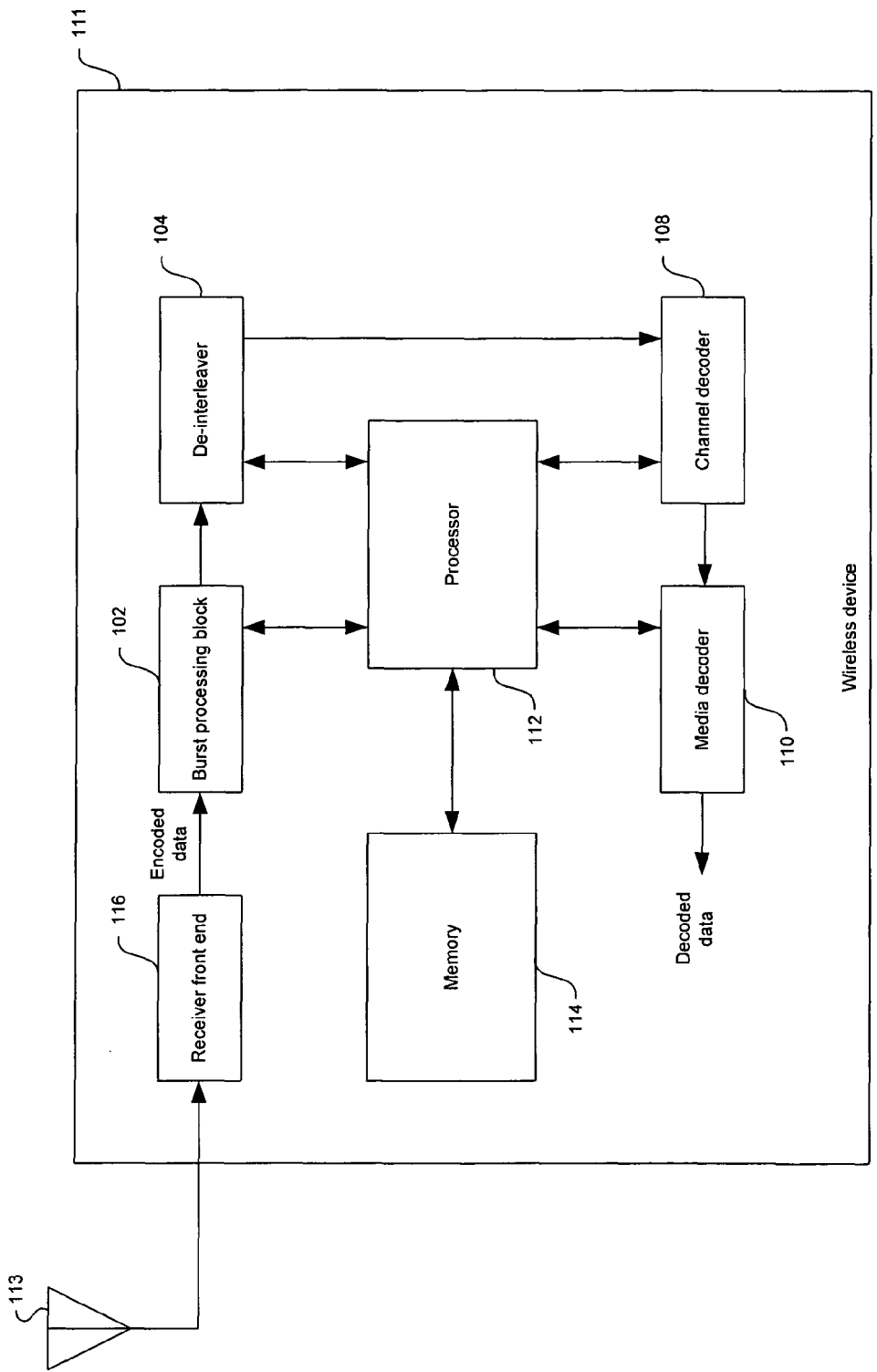
FIG. 1B is a block diagram illustrating a multilayer system with a processor and memory for improving decoding, in accordance with an embodiment of the invention.

FIG. 1B is a block diagram illustrating a multilayer system with a processor and memory for improving decoding, in accordance with an embodiment of the invention. Referring to FIG. 1B, there is shown a wireless device 111 that may comprise a receiver front end 116, a processor 112, a memory 114, the burst process block 102, the de-interleaver 104, the channel decoder 108, and the media decoder 110. The wireless device 111 may be enabled to perform SAIC algorithms and/or redundancy-based decoding algorithms.

The receiver front end 116 may comprise suitable logic, circuitry, and/or code that may enable receiving bit sequences from the antenna 113 and processing the received bit sequences for further processing by the burst processing block 102. In this regard, the receiver front end 116 may enable analog and/or digital processing of the data received from the antenna 113.

The processor 112 may comprise suitable logic, circuitry, and/or code that may enable performing computations and/or management operations. The processor 112 may also be enabled to communicate and/or control at least a portion of the operations of the burst process block 102, the de-interleaver 104, the channel decoder 108 and the media decoder 110. The memory 114 may comprise suitable logic, circuitry, and/or code that may enable storage of data and/or control information. The memory 114 may be enabled to store information that may be utilized and/or that may be generated by the burst process block 102, the de-interleaver 104, the channel decoder 108 and the media decoder 110. In this regard, information may be transferred to and from the memory 114 via the processor 112, for example.

Figure 1C:
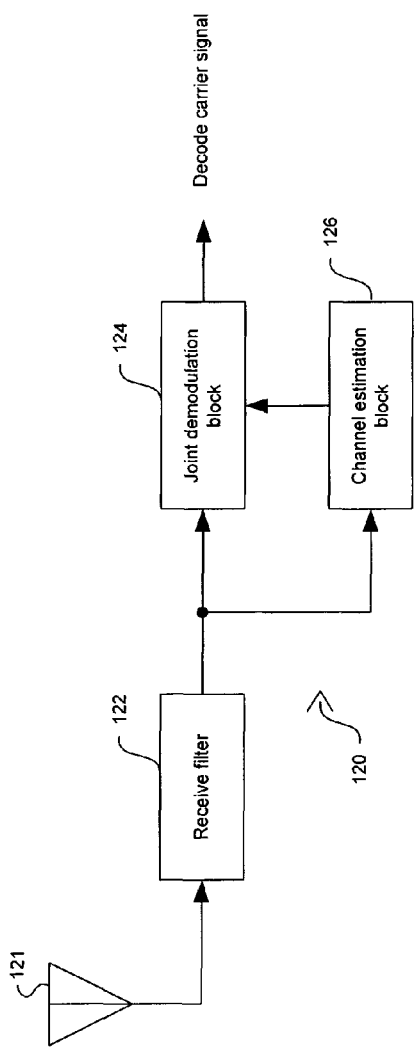
FIG. 1C is a block diagram illustrating an exemplary implementation of a joint demodulation algorithm for single antenna interference cancellation, in connection with an embodiment of the invention.

FIG. 1C is a block diagram illustrating an exemplary implementation of a joint demodulation (JD) algorithm for SAIC, in connection with an embodiment of the invention. Referring to FIG. 1C, there is shown a portion of a receiver 120 that may comprise a single antenna 121, a receive filter 122, a joint demodulation block 124, and a channel estimation block 126. The portion of the receiver 120 shown in FIG. 1C may correspond to an implementation of a portion of the wireless device 111 in FIG. 1B, for example. The receiver 120 may be enabled to process a carrier signal and an interference or interfering signal. The received signals may correspond to multiple copies of the transmitted signal at different amplitudes and time delays, for example. The receiver 120 may utilize training sequence codes (TSCs) that may change in time and amplitude when arriving at the receiver to characterize the multi-path delay profile of the transmission channel for both the carrier signal and the interfering signal. Characterization of the interfering signal transmission channel is performed to cancel at least a portion of the interfering signal at the receiver 120.

The receive filter 122 may comprise suitable logic, circuitry, and/or code that may enable the filtering of a portion of the interfering signal from the carrier signal, for example. The filtered signal may be communicated to the joint demodulation block 124 and to the channel estimation block 126. The channel estimation block 126 may comprise suitable logic, circuitry, and/or code that may enable dynamic determination of the multi-path delay profile of the transmission channel. The joint demodulation block 124 may comprise suitable logic, circuitry, and/or code that may enable the carrier signal bit sequence estimation by utilizing a Viterbi equalizer, for example.

Figure 1D:
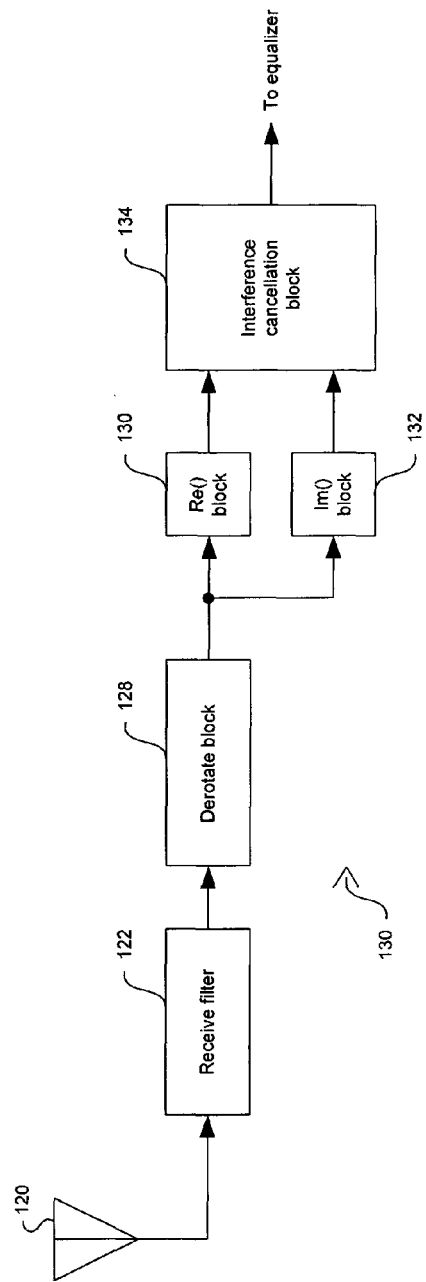
FIG. 1D is a block diagram illustrating an exemplary implementation of a blind interference cancellation algorithm for single antenna interference cancellation, in connection with an embodiment of the invention.

FIG. 1D is a block diagram illustrating an exemplary implementation of a blind interference cancellation (BIC) algorithm for SAIC, in connection with an embodiment of the invention. Referring to FIG. 1D, there is shown a portion of a receiver 130 that may comprise a single antenna 121, a receive filter 122, a derotate block 128, a real component (Re) block 130, an imaginary component (Im) block 132, and an interference cancellation block 134. The portion of the receiver 130 shown in FIG. 1D may correspond to an implementation of a portion of the wireless device 111 in FIG. 1B, for example.

The receiver 130 may be enabled to determine the multi-path delay profile of the transmission channel for the carrier signal. In this regard, the operation of the receiver 130 may be referred to as blind because there is no attempt by the receiver 130 to determine or estimate the channel of the interfering signal for canceling the interfering signal. The receiver 130 may utilize the known characteristics of, for example, Gaussian Minimum Shift Keying (GMSK) modulated signals, to separate the desired signal from the interfering signal before attempting to recover the desired signal. In this regard, some of the properties of GMSK signal may enable the receiver 130 to process the received signal to obtain a virtual signal that may correspond to a signal received from a "virtual second antenna". After the virtual signal is generated, a plurality of multiple antenna interference cancellation techniques may be utilized to cancel or suppress the interfering signal.

The derotate block 128 may comprise suitable logic, circuitry, and/or code that may enable the generation of a rotated signal from the received signal. Rotating the phase of the received signal by utilizing, for example, a CORDIC algorithm, may generate the rotated signal. The rotated signal may be communicated to the Re( ) block 130 where the real component of the signal may be obtained. The rotated signal may also be communicated to the Im( ) block 132 where the imaginary component of the signal may be obtained. The interference cancellation block 134 may comprise suitable logic, circuitry, and/or code that may enable the operation of at least one of the multiple antenna interference cancellation techniques that may be utilized to cancel or suppress the interfering signal. The output of the interference cancellation block 134 may be communicated to an equalizer, such as a Viterbi equalizer, for example.

Figure 2:
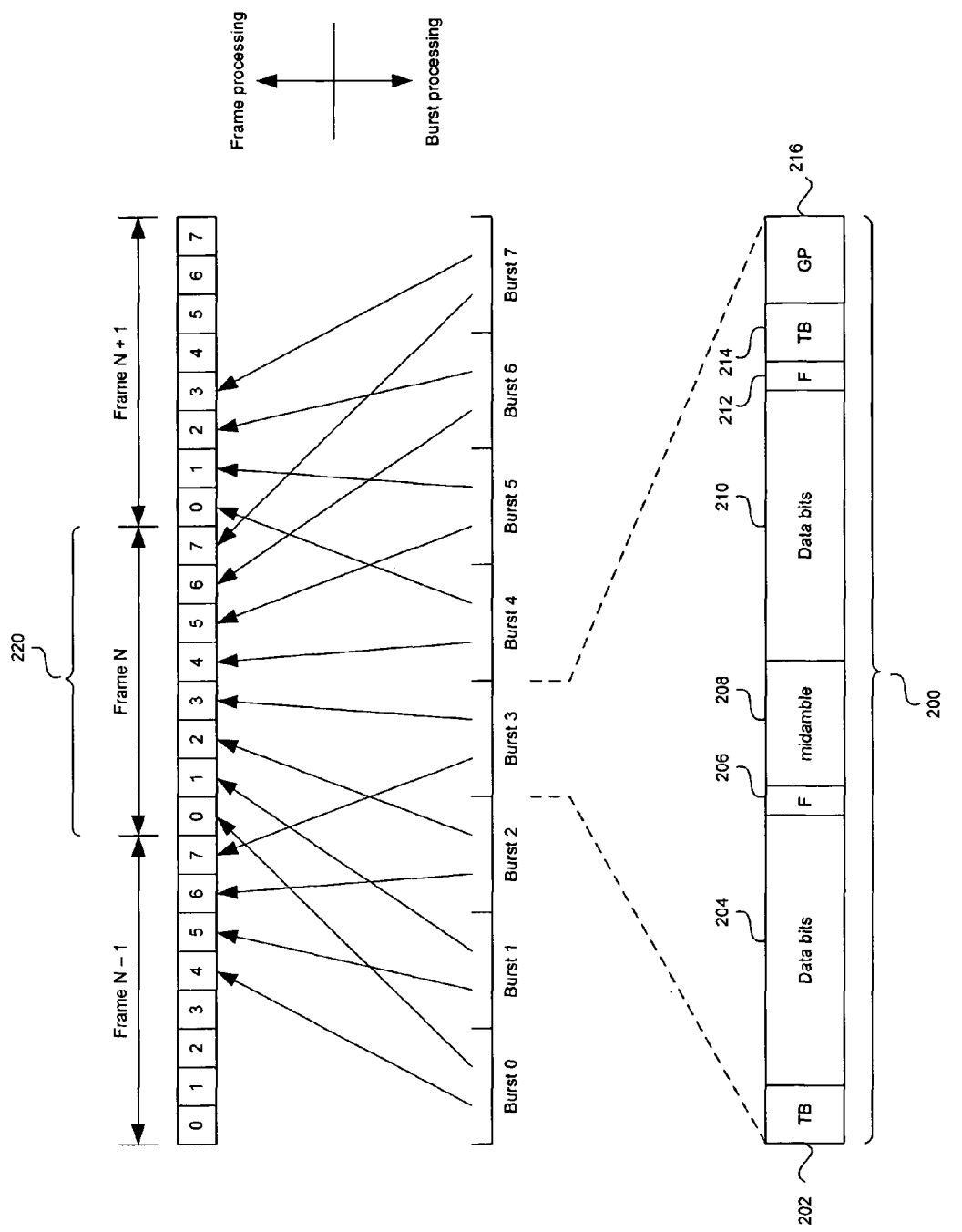
FIG. 2 is a diagram illustrating exemplary combined frame and burst processes in GSM applications, in accordance with an embodiment of the invention.

FIG. 2 is a diagram illustrating exemplary combined frame and burst processes in GSM applications, in accordance with an embodiment of the invention. Referring to FIGS. 1A and 2, there is shown a series of at least one time slot burst 200 and a series of at least one frame 220. The series of at least one time slot burst 200, as shown, may correspond to Burst 0 through Burst 7, while the series of at least one frame 220, as shown, may correspond to Frame N−1 through Frame N+1. The series of at least one time slot burst 200 may be generated during the burst processing operation of the receiver 100, for example, while the series of at least one frame 220 may be generated during the frame processing of the receiver 100, for example. The time slot burst 200 may comprise a tail bit (TB) 202, first data bits 204, a flag bit (F) 206, a midamble 208, second data bits 210, a flag bit (F) 212, a tail bit (TB) 214, and guard bits (GP) 216. The TB 202 and the TB 214 may comprise 3 bits each. The first data bits 204 and the second data bits 210 may comprise 57 bits each. The F 206 and the F 212 flag bits may comprise 1 bit each. The midamble 208 may comprise 26 bits and may be utilized as a training sequence for channel equalization, for example. The frame 220 may comprise eight partitions or sequences of bits, for example.

As shown, the first data bits 204 in the Burst 0 through Burst 3 may be transferred or communicated to the fifth, sixth, seventh, and eight sequences of the Frame N−1 respectively, for example. The first data bits 204 in the Burst 4 through Burst 7 may be transferred or communicated to the fifth, sixth, seventh, and eight sequences of the Frame N respectively, for example. The second data bits 210 in the Burst 0 through Burst 3 may be transferred or communicated to the first, second, third, and fourth sequences of the Frame N respectively, for example. The second data bits 210 in the Burst 4 through Burst 7 may be transferred or communicated to the first, second, third, and fourth sequences of the Frame N+1 respectively, for example. The decoding of bit sequences transferred or communicated from the time slot bursts in the burst processing to the frames in the frame processing may be performed by utilizing the Viterbi algorithm to reduce the number of sequences utilized during the decoding search. In this regard, utilizing signal redundancy and at least one physical constraint may result in a more accurate decoding operation. Moreover, burst processing and frame processing operations may be performed that may be consistent with single antenna interference cancellation operations supported by the receiver 100. While the burst structure described in FIG. 2 corresponds to that of a GSM burst, the receiver 100 may also support other burst structures, such as bursts for wideband code division multiple access (WCDMA), for example.

Figure 3A:
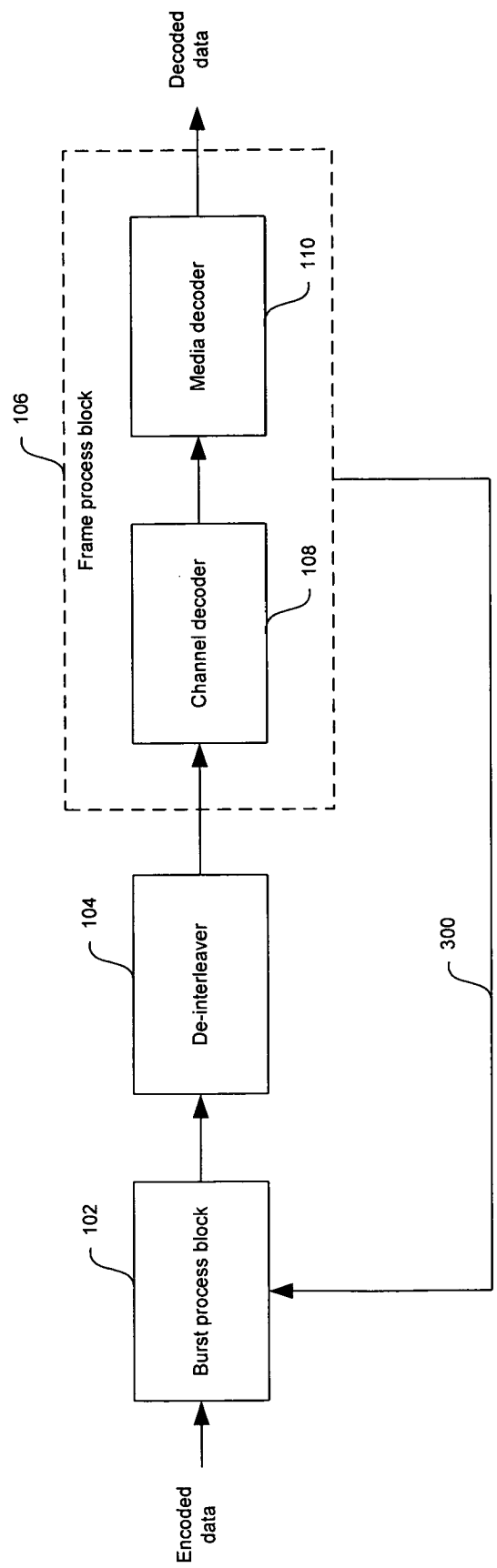
FIG. 3A is a block diagram illustrating an iterative multilayer approach for improving decoding, in accordance with an embodiment of the invention.

FIG. 3A is a block diagram illustrating an iterative multilayer approach for improving decoding, in accordance with an embodiment of the invention. Referring to FIG. 3A, there is shown the receiver 100 in FIG. 1A with a feedback signal from the frame process portion of the multilayer decoding approach to the burst process portion of the multilayer decoding approach. For redundancy-based decoding, the frame process may comprise the use of redundancy verification of the results generated by the Viterbi algorithm and the use of physical constraints to reduce decoding errors that may result from the standard Viterbi algorithm. For SAIC operations, the frame process may also be utilized to reduce decoding errors. The burst process may then utilize information decoded in the frame process as an input to improve the channel estimation and channel equalization operations, for example. The U.S. application Ser. No. 11/189,634 filed on Jul. 26, 2005, discloses a method and system for improving reception in wired and wireless receivers through redundancy and iterative processing, and is hereby incorporated herein by reference in its entirety.

Figure 3B:
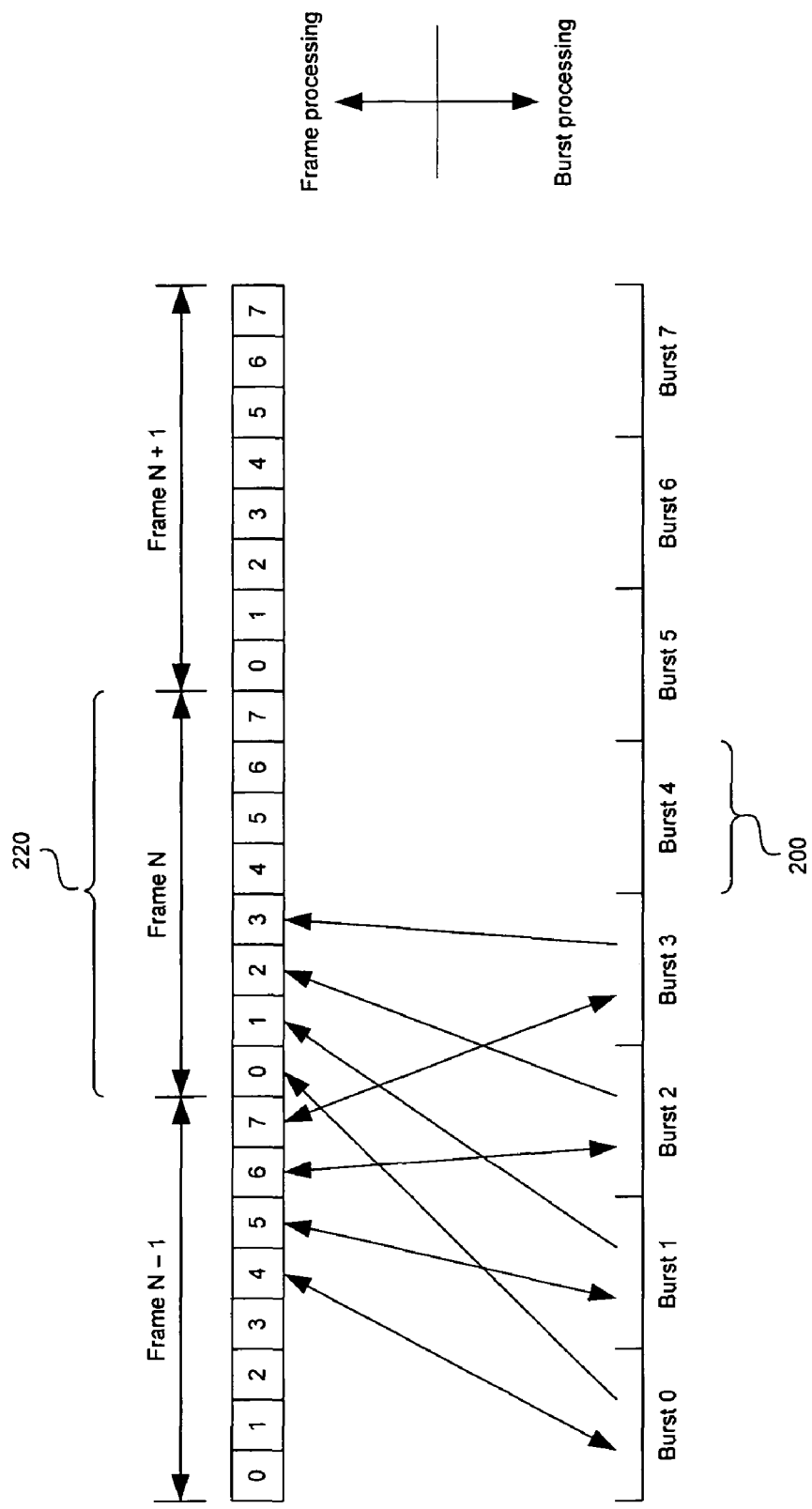
FIG. 3B is a diagram illustrating exemplary iterative frame and burst processes in GSM applications, in accordance with an embodiment of the invention.

FIG. 3B is a diagram illustrating exemplary iterative frame and burst processes in GSM applications, in accordance with an embodiment of the invention. Referring to FIG. 3B, there is shown a series of at least one time slot burst 200 and a series of at least one frame 220 as illustrated in FIG. 2. The series of at least one time slot burst 300 may correspond to Burst 0 through Burst 7, while the series of at lest one frame 320 may correspond to Frame N−1 through Frame N+1.

There may be two types of iterative processes to consider: a causal iterative process and a non-causal iterative process. For the causal iterative process, Burst 0 through Burst 3 may each have 57 data bits from the first data bits 204 portion of the time slot burst 200 that have been decoded during the frame processing of Frame N−1. Utilizing the decoded 57 data bits in each of Burst 0 through Burst 3 and the 26 bits in the midamble 208, the burst process may be recalculated or a second iteration of the burst process may occur. In this regard, the channel estimation operation of the burst process may be improved by utilizing the decoded data bits generated by the frame process during a second iteration. Moreover, the MLSE in the channel equalization operation of the burst process may consider that the decoded data bits are known with a higher probability than during the first iteration. In some instances, to reduce the complexity that may be introduced by a second iteration operation, the burst process may enable performing a second iteration on selected time slot bursts determined during the first iteration. In this regard, a particular time slot burst may be selected for a second iteration when it is associated with having a low carrier-to-interference (C/I) value, for example. Once the burst process improves the data, it may be further interleaved and processed by the frame process. The frame process my use a standard frame process or determine the best sequence based on, for example, the redundancy and/or by utilizing single antenna interference cancellation operations.

For the non-causal iterative process, bits from Burst 0 through Burst 7 may be needed to recalculate the burst process for bit sequences that may be transferred to Frame N. Data from Frame N−1 and/or data from Frame N+1 may be utilized to calculate the burst process for bit sequences that may be transferred to Frame N. Utilizing the decoded 114 data bits in each of Burst 0 through Burst 7 and the 26 bits in the midamble 208, the burst process may be recalculated. As with the causal iterative process, a particular time slot burst may be selected for a second iteration when it is associated with having a low carrier-to-interference (C/I) value, for example.

While the iterative processes described in FIG. 3B may be utilized for GSM bursts, the iterative processes may also be implemented for other burst structures, such as for wideband code division multiple access (WCDMA), for example.

Figure 4A:
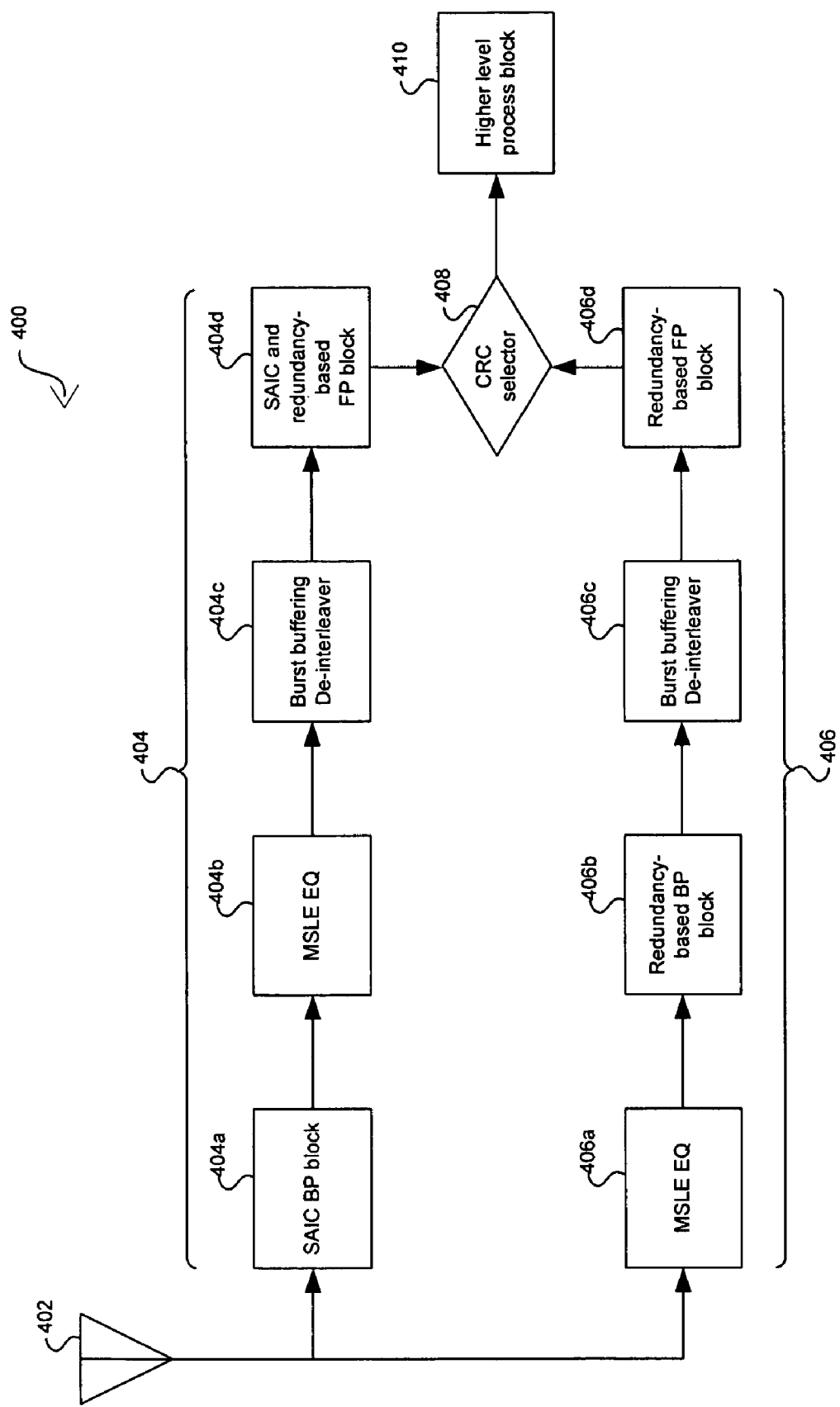
FIG. 4A is a block diagram illustrating an exemplary parallel adaptation of SAIC and redundancy-based decoding algorithms, in accordance with an embodiment of the invention.

FIG. 4A is a block diagram illustrating an exemplary parallel adaptation of SAIC and redundancy-based decoding algorithms, in accordance with an embodiment of the invention. Referring to FIG. 4A, there is shown a portion of a wireless receiver 400 that may comprise a single antenna 402, a single antenna interference cancellation (SAIC) decoding path 404, a redundancy-based decoding path 406, a cyclic redundancy check (CRC) selector 408, and a higher level process block 410. The redundancy-based decoding path 406 may provide robust decoding a plurality of different channel conditions and may generally provide a uniform gain when compared to conventional receivers, for example. The SAIC decoding path 404 may provide better interference cancellation performance when interference is dominant in the transmission channel, for example.

The SAIC decoding path 404 may comprise a SAIC burst process (BP) block 404a, a maximum-likelihood sequence estimation (MLSE) equalizer (EQ) 404b, a burst buffering de-interleaver 404c, and a SAIC and redundancy-based frame process (FP) block 404d. The SAIC BP block 404a may comprise suitable logic, circuitry, and/or code that may enable processing of bit sequence bursts communicated from the antenna 402, for example. The MLSE EQ 404b may comprise suitable logic, circuitry, and/or code that may enable equalization of the processed bit sequence bursts from the SAIC BP block 404a. The burst buffering de-interleaver 404c may comprise suitable logic, circuitry, and/or code that may enable multiplexing of bits from a plurality of data bursts received from the MLSE EQ 404b to form the frame inputs to the SAIC and redundancy-based FP block 404d. The SAIC and redundancy-based FP block 404d may comprise suitable logic, circuitry, and/or code that may enable support for frame processing for decoding bit sequences in SAIC algorithms and frame processing in redundancy-based algorithms. For voice data processing, for example, frame processing may enable decoding of a block using 8 bursts of data for full rate voice channels or 4 bursts of data for half rate voice channels. The SAIC and redundancy-based FP block 404d may also enable the generation of a redundancy verification parameter, such as a CRC, for example, for the decoded bit sequence. The SAIC and redundancy-based FP block 404d may support iterative processing by communicating a portion of the frame processing results to the SAIC BP block 404a as described in FIGS. 3A and 3B, for example.

The redundancy-based decoding path 406 may comprise an MLSE EQ 406a, a redundancy-based BP block 406b, a burst buffering de-interleaver 406c, and a redundancy-based FP block 406d. The MLSE EQ 406a may comprise suitable logic, circuitry, and/or code that may enable equalization of the bit sequence bursts communicated from the antenna 402. The redundancy-based BP block 406b may comprise suitable logic, circuitry, and/or code that may enable processing of bit sequence bursts received from the MSLE EQ 406a. The burst buffering de-interleaver 406c may comprise suitable logic, circuitry, and/or code that may enable multiplexing of bits from a plurality of data bursts received from the redundancy-based BP block 406b to form the frame inputs to the redundancy-based FP block 406d. The redundancy-based FP block 406d may comprise suitable logic, circuitry, and/or code that may enable support for frame processing for decoding bit sequences in redundancy-based algorithms. For voice data processing, for example, frame processing may enable decoding of a block using 8 bursts of data for full rate voice channels or 4 bursts of data for half rate voice channels. The redundancy-based FP block 406d may also enable the generation of a redundancy verification parameter, such as a CRC, or continuity and smoothness of the speech parameters, for example, for the decoded bit sequence. The redundancy-based FP block 406d may also support iterative processing by communicating a portion of the frame processing results to the redundancy-based BP block 404a as described in FIGS. 3A and 3B, for example.

The CRC selector 408 may comprise suitable logic, circuitry, and/or code that may enable selection of one of the decoded bit sequence generated by the SAIC and redundancy-based FP block 404d and the decoded bit sequence generated by the redundancy-based FP block 406d. The CRC selector 408 may utilize a redundancy verification parameter, such as the CRC, for example, to determine which decoded bit sequence to select. The decoded bit sequence selected by the CRC selector 408 may be communicated to the higher level process block 410 where further video, audio, and/or speech processing of the received bit sequence may be performed by the wireless receiver 400.

Figure 4B:
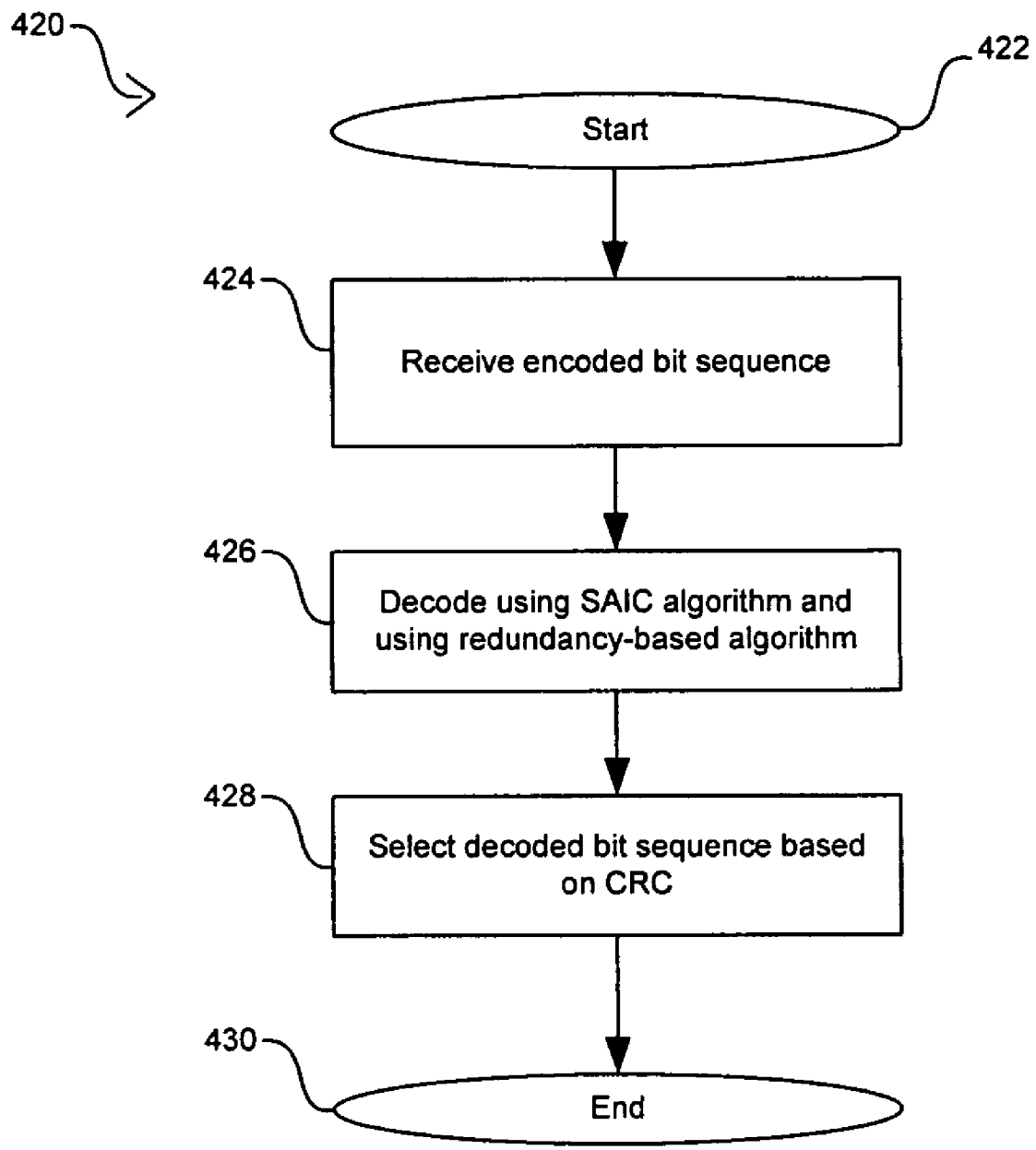
FIG. 4B is a flow diagram illustrating exemplary steps in the operation of the parallel adaptation of SAIC and redundancy-based decoding algorithms, in accordance with an embodiment of the invention.

FIG. 4B is a flow diagram illustrating exemplary steps in the operation of the parallel adaptation of SAIC and redundancy-based decoding algorithms, in accordance with an embodiment of the invention. Referring to FIG. 4B, after start step 422, in step 424, a received bit sequence may be communicated from the antenna 402 to the SAIC decoding path 404 and to the redundancy-based decoding path 406. In step 426, the received bit sequence may be processed by each of the SAIC decoding path 404 and the redundancy-based decoding path 406. Each path may generate a decoded bit sequence and a corresponding redundancy verification parameter, such as a CRC, for example, for the decoded bit sequence. In step 428, the CRC selector 408 may select from the decoded bit sequences generated by each of the paths in step 426 the one that corresponds to the correct CRC value for the bit sequence. The decoded bit sequence selected by the CRC selector 408 may be communicated to the higher level process block 410 for further processing. After step 428, the process may proceed to end step 430.

Figure 5A:
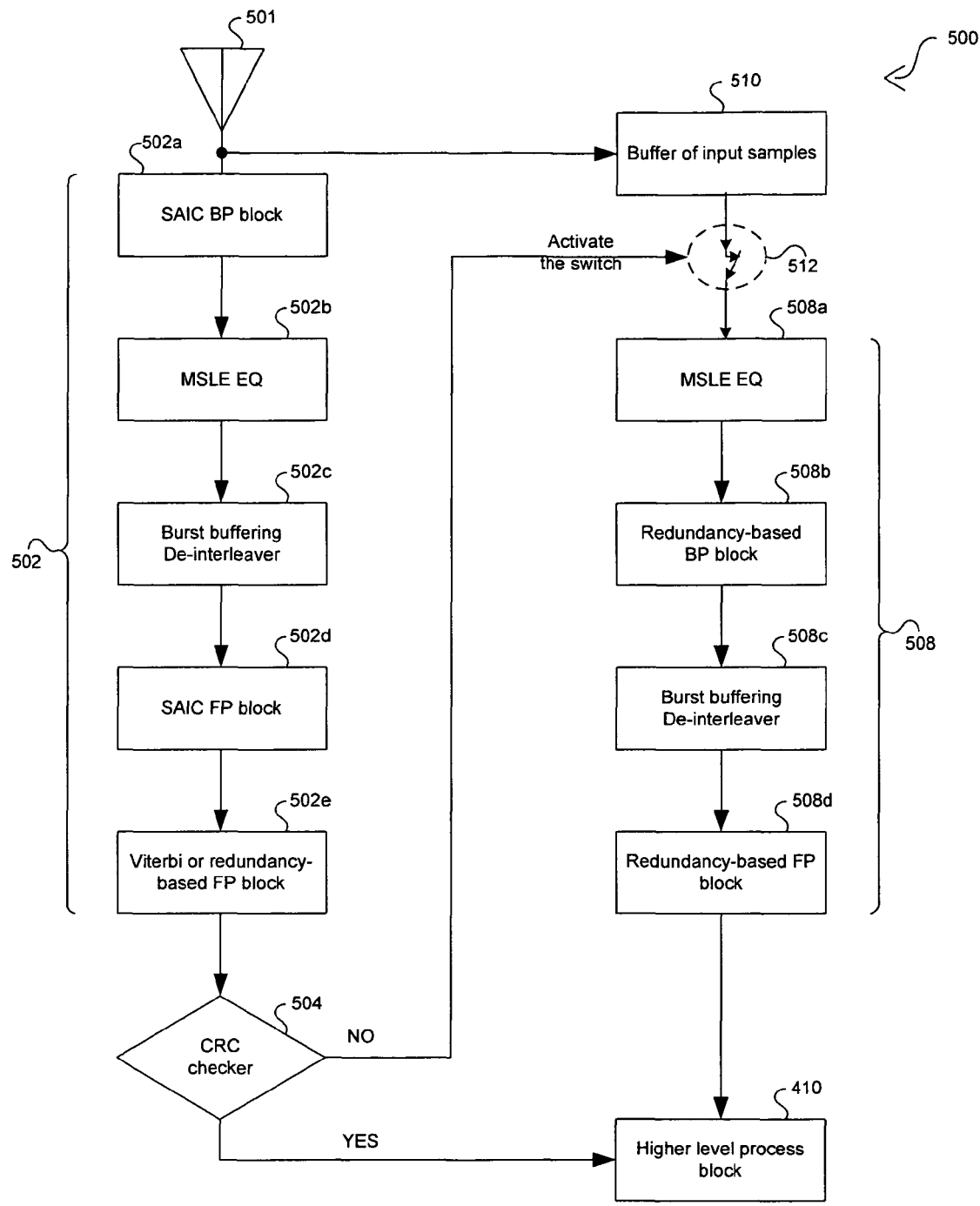
FIG. 5A is a block diagram illustrating exemplary sequential adaptation of SAIC and redundancy-based decoding algorithms, in accordance with an embodiment of the invention.

FIG. 5A is a block diagram illustrating exemplary sequential adaptation of SAIC and redundancy-based decoding algorithms, in accordance with an embodiment of the invention. Referring to FIG. 5A, there is shown a portion of a wireless receiver 500 that may comprise a single antenna 501, a SAIC decoding path 502, a redundancy-based decoding path 508, a CRC checker 504, higher level process block 410, a buffer of input samples 510, and a switch 512. As with the parallel adaptation described in FIG. 4A, the redundancy-based decoding path 508 in the sequential adaptation may provide robust decoding for many channel conditions and may generally provide a uniform gain when compared to conventional receivers, for example. Similarly, the SAIC decoding path 502 may provide better interference cancellation performance when interference is dominant in the transmission channel, for example.

The SAIC decoding path 502 may comprise a SAIC BP block 502a, an MLSE EQ 502b, a burst buffering de-interleaver 502c, a SAIC FP block 502d, and a Viterbi or redundancy-based FP block 502e. The SAIC BP block 502a may comprise suitable logic, circuitry, and/or code that may enable processing of bit sequence bursts communicated from the antenna 501, for example. The MLSE EQ 502b may comprise suitable logic, circuitry, and/or code that may enable equalization of the processed bit sequence bursts from the SAIC BP block 502a. The burst buffering de-interleaver 502c may comprise suitable logic, circuitry, and/or code that may enable multiplexing of bits from a plurality of data bursts received from the MLSE EQ 502b to form the frame inputs to the SAIC FP block 502d. The SAIC FP block 502d may comprise suitable logic, circuitry, and/or code that may enable support for frame processing for decoding bit sequences in SAIC algorithms. The Viterbi or redundancy-based FP block 502e may comprise suitable logic, circuitry, and/or code that may enable support for frame processing for decoding bit sequences utilizing Virterbi decoding algorithms. In this regard, the Viterbi or redundancy-based FP block 502e may provide additional frame processing operations to those provided by the SAIC FP block 502d. In some instances, such as when design requirements may limit the computational power of the wireless receiver 500, for example, only a Viterbi operation may be implemented for the block 502e as part of the SAIC decoding path 502.

The CRC checker 504 may comprise suitable logic, circuitry, and/or code that may enable verification that the decoded bit sequence generated by the Viterbi or redundancy-based FP block 502e is correct. When the CRC is correct, the decoded bit sequence may be communicated to the higher level process block 410 where further video, audio, and/or speech processing of the received bit sequence may be performed. When the CRC of the decoded bit sequence is not correct, the CRC checker 504 may enable transfer of information and/or data associated with the received bit sequence from the antenna to the redundancy-based decoding path 508 via the buffer of input samples 510. Operation on the data stored in the buffer of input samples 510 by the redundancy-based decoding path 508 is enabled by the CRC checker 504 activating the switch 512. In this regard, the utilization of the redundancy-based decoding path 508 is conditioned on whether the SAIC decoding path 502 is successful in decoding the received bit sequence.

The redundancy-based decoding path 508 may comprise an MLSE EQ 508a, a redundancy-based BP block 508b, a burst buffering de-interleaver 508c, and a redundancy-based FP block 508d. The buffer of input samples 510 may comprise suitable logic, circuitry, and/or code that may enable storage of bit sequences received from the antenna 510. The MLSE EQ 508a may comprise suitable logic, circuitry, and/or code that may enable equalization of the bit sequence received from the antenna 501 and buffered in buffer of input samples 510. In this regard, the MLSE EQ 508a may operate on the buffered data when the switch 512 has been activated by the CRC checker 504. The redundancy-based BP block 508b may comprise suitable logic, circuitry, and/or code that may enable processing of bit sequence bursts received from the MSLE EQ 508a. The burst buffering de-interleaver 508c may comprise suitable logic, circuitry, and/or code that may enable multiplexing of bits from a plurality of data bursts received from the redundancy-based BP block 508b to form the frame inputs to the redundancy-based FP block 508d. The redundancy-based FP block 508d may comprise suitable logic, circuitry, and/or code that may enable support for frame processing for decoding bit sequences in redundancy-based algorithms. The redundancy-based FP block 508d may also support iterative processing by communicating a portion of the frame processing results to the redundancy-based BP block 508b as described in FIGS. 3A and 3B, for example.

In operation, a received bit sequence may be communicated from the antenna 501 to the SAIC decoding path 502. The received bit sequence may be processed by the SAIC decoding path 502 to generate a decoded bit sequence and a corresponding redundancy verification parameter, such as a CRC, for example, for the decoded bit sequence. The CRC checker 504 may verify that the CRC value generated for the decoded bit sequence is correct. When the CRC checker 504 verifies that the CRC is correct, the decoded bit sequence is communicated to the higher level process block 410 for further processing. When the CRC checker 504 determines that the CRC is not correct, information and/or data associated with the received bit sequence may be communicated to the redundancy-based decoding path 508 via the buffer of input samples 510. The redundancy-based decoding path 508 may generate a subsequent decoded bit sequence that may be communicated to the higher level process block 410 for further processing.

While FIG. 5A illustrates an exemplary implementation where the redundancy-based decoding path 508 may be performed conditioned on the result of the SAIC decoding path 502, other implementations need not be limited in this manner. For example, the redundancy-based decoding path 508 may be performed first and the SAIC decoding path 502 may be performed subsequently when the CRC checker 504 determines that the CRC resulting from the redundancy-based decoding path 508 is not correct.

Figure 5B:
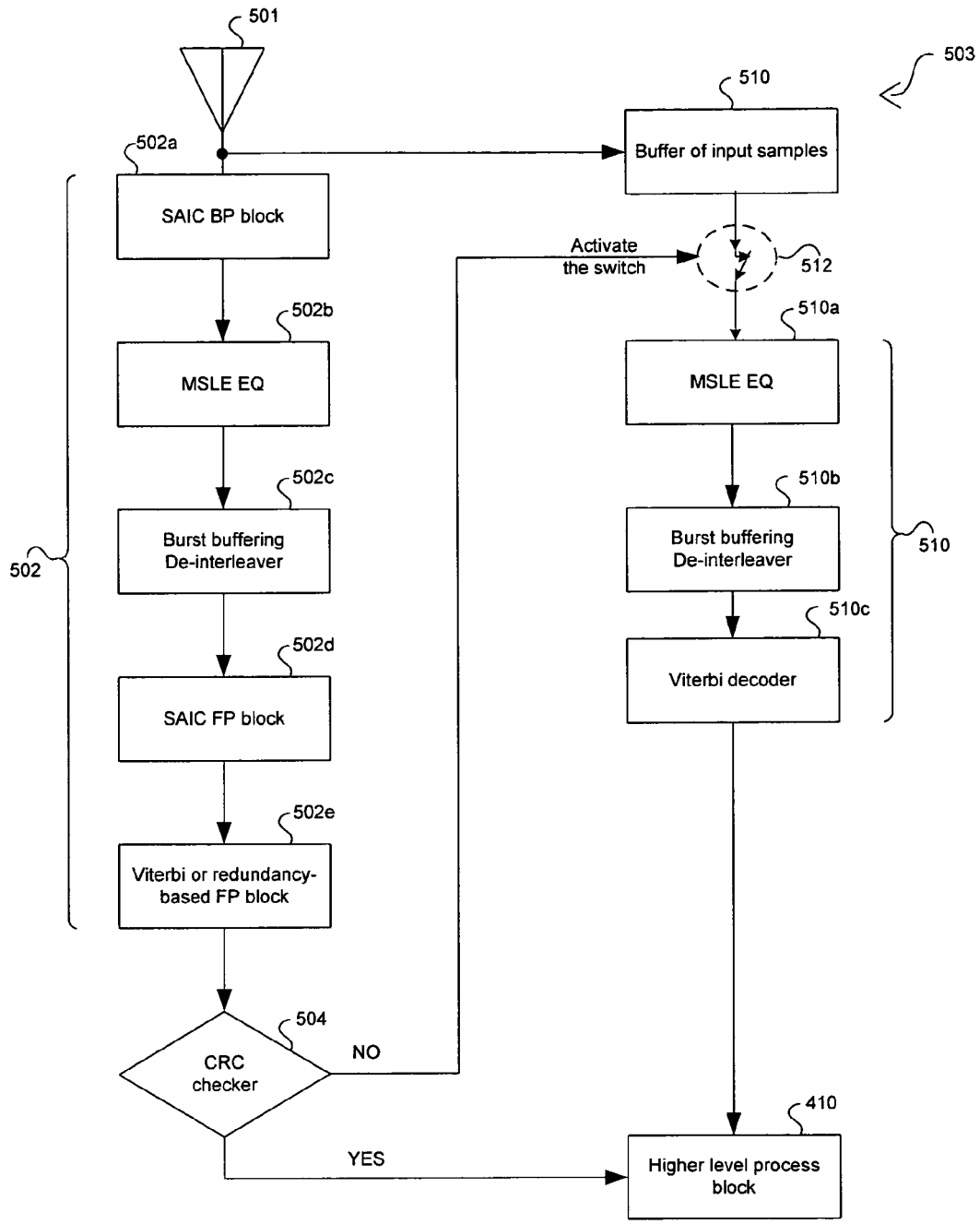
FIG. 5B is a block diagram illustrating exemplary sequential adaptation of SAIC and Viterbi decoding algorithms, in accordance with an embodiment of the invention.

FIG. 5B is a block diagram illustrating exemplary sequential adaptation of SAIC and Viterbi decoding algorithms, in accordance with an embodiment of the invention. Referring to FIG. 5B, there is shown a portion of a wireless receiver 503 that may be differ from the wireless receiver 500 in FIG. 5A in that a redundancy-based decoding path 510 found in the wireless receiver 503 may comprise an MLSE EQ 510a, a burst buffer de-interleaver 510b, and a Viterbi decoder 510c. The MLSE EQ 510a may be substantially similar to the MLSE EQ 508a described in FIG. 5A. The burst buffering de-interleaver 510b may comprise suitable logic, circuitry, and/or code that may enable multiplexing of bits from a plurality of data bursts received from the MLSE EQ 510a to form the frame inputs to the Viterbi decoder 510c. The Viterbi decoder 510c may comprise suitable logic, circuitry, and/or code that may enable decoding based on the Viterbi algorithm. The implementation described in FIG. 5B for the wireless receiver 503 may result in reduced processing requirements or overhead than the processing that may be needed for the operation of the wireless receiver 500 described in FIG. 5A.

While FIG. 5B illustrates an exemplary implementation where the redundancy-based decoding path 510 may be performed conditioned on the result of the SAIC decoding path 502, other implementations need not be limited in this manner. For example, the redundancy-based decoding path 510 may be performed first and the SAIC decoding path 502 may be performed subsequently when the CRC checker 504 determines that the CRC resulting from the redundancy-based decoding path 510 is not correct.

Figure 6A:
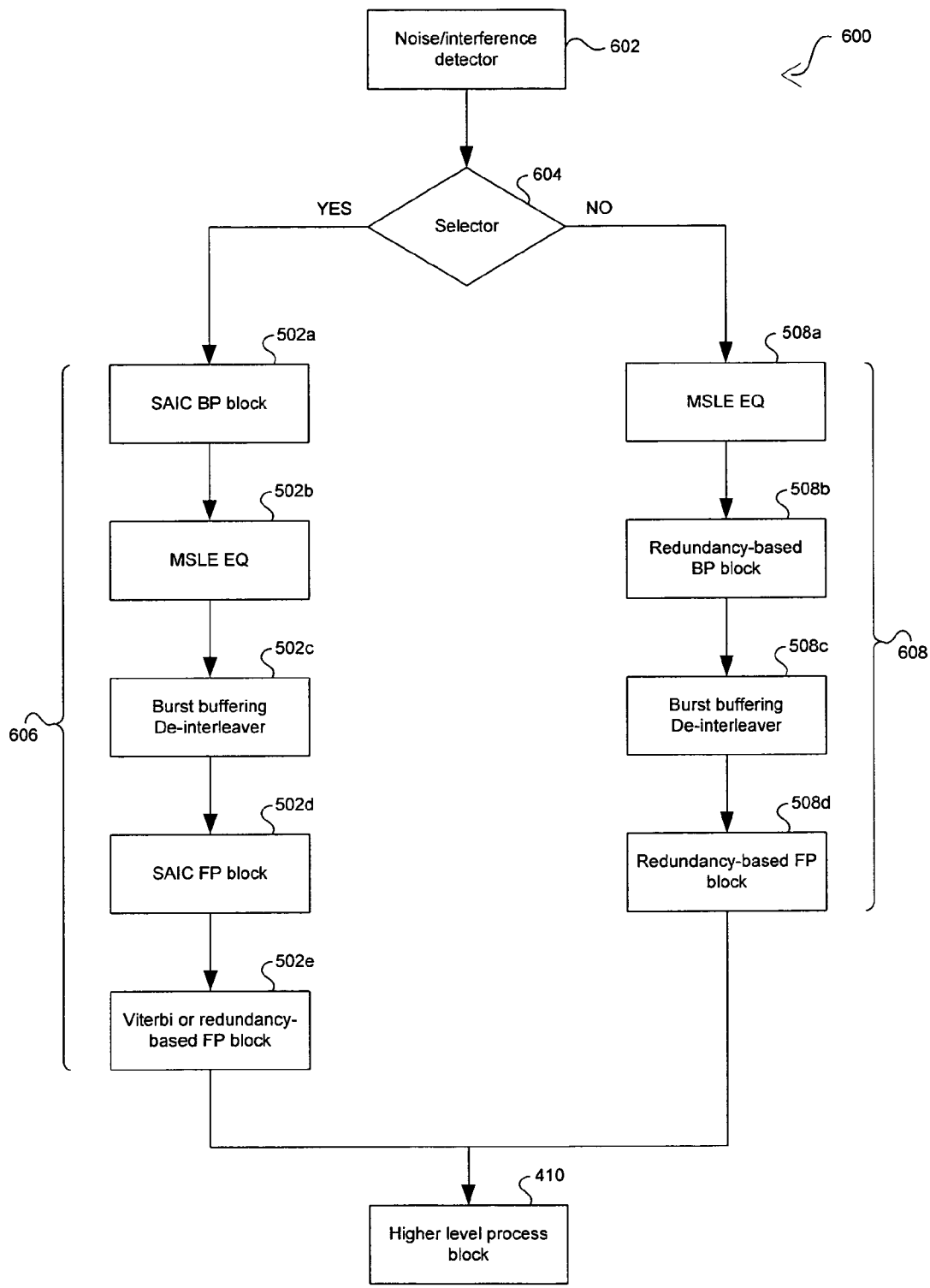
FIG. 6A is a block diagram illustrating an exemplary adaptation that selects between SAIC and redundancy-based decoding algorithms, in accordance with an embodiment of the invention.

FIG. 6A is a block diagram illustrating an exemplary adaptation that selects between SAIC and redundancy-based decoding algorithms, in accordance with an embodiment of the invention. Referring to FIG. 6A, there is shown a portion of a wireless receiver 600 that may comprise a noise and interference detector 602, a selector 604, a SAIC decoding path 606, a redundancy-based decoding path 608, and a higher level process block 610.

The noise and interference detector 602 may comprise suitable logic, circuitry, and/or code that may be adapted to detect or identify noise and interference levels in received bit sequences. In this regard, the U.S. application Ser. No. 11/159,931 filed on Jun. 13, 2005, discloses colored noise detection algorithm for noise and/or interference detection, and is hereby incorporated herein by reference in its entirety. Additional noise and interference detection techniques may be based on the received signal level and the signal-to-noise ration (SNR), for example. The selector 604 may comprise suitable logic, circuitry, and/or code that may be enabled to select whether the decoding of the received bit sequences may be performed by the SAIC decoding path 606 or by the redundancy-based decoding path 608 based on the results provided by the noise and interference detector 602.

The SAIC decoding path 606 may comprise the SAIC BP block 502a, the MLSE EQ 502b, the burst buffering de-interleaver 502c, the SAIC FP block 502d, and the Viterbi or redundancy-based FP block 502e substantially as described in FIG. 5A. When the selector 604 selects decoding by the SAIC decoding path 606, the decoded bit sequence that results from the frame processing performed by the SAIC decoding path 606 may be communicated to the higher level process block 410. The redundancy-based decoding path 608 may comprise the MLSE EQ 508a, the redundancy-based BP block 508b, the burst buffering de-interleaver 508c, and the redundancy-based FP block 508d substantially as described in FIG. 5A. When the selector 604 selects decoding by the redundancy-based decoding path 608, the decoded bit sequence that results from the frame processing performed by the redundancy-based decoding path 608 may be communicated to the higher level process block 410.

Figure 6B:
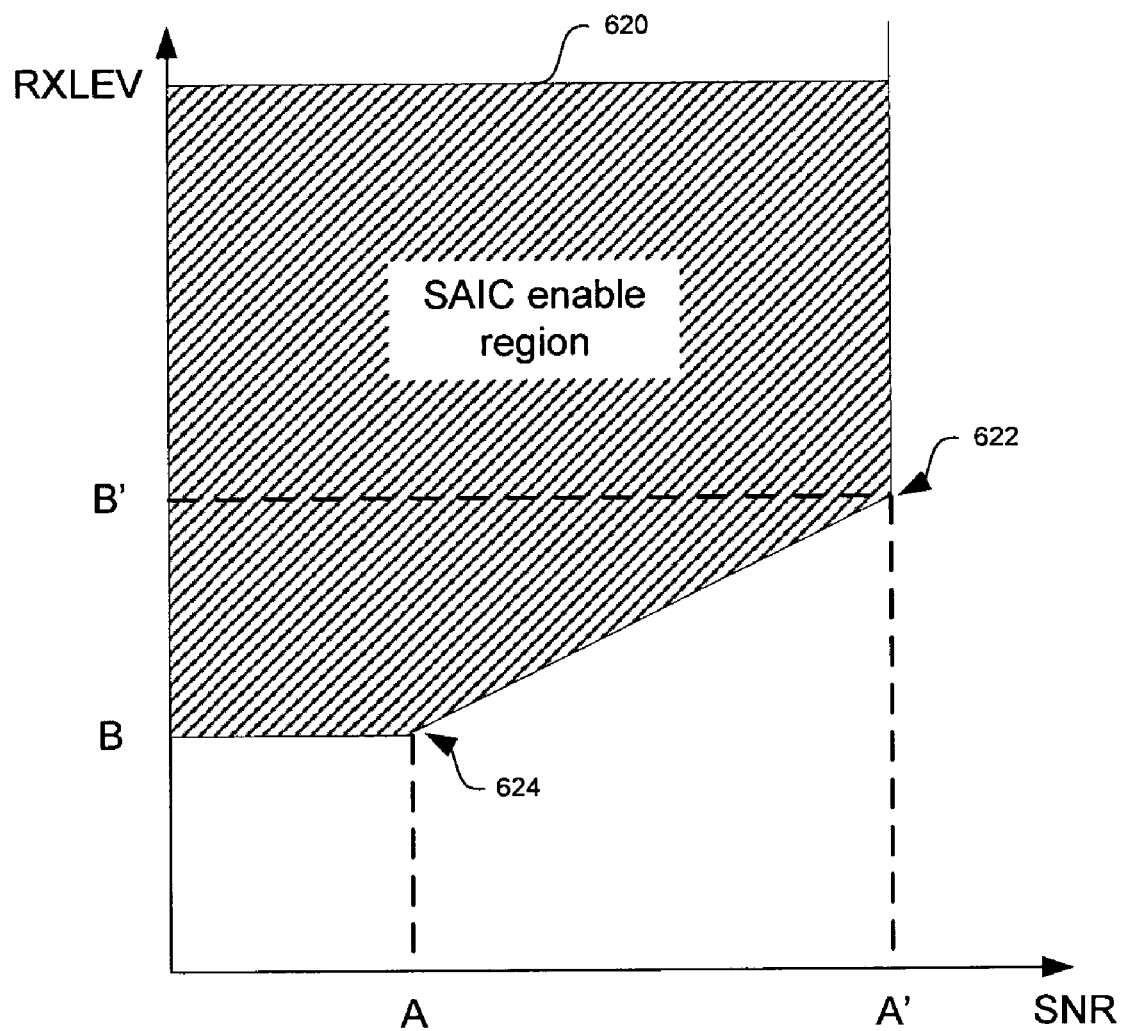
FIG. 6B is a diagram illustrating an exemplary decision region for enabling SAIC decoding in the adaptation that selects between SAIC and redundancy-based decoding algorithms, in accordance with an embodiment of the invention.

FIG. 6B is a diagram illustrating an exemplary decision region for enabling SAIC decoding in the adaptation that selects between SAIC and redundancy-based decoding algorithms, in accordance with an embodiment of the invention. Referring to FIG. 6B, there is shown a two-dimensional plot of a received signal level, such as RXLEV for GSM applications, for example, and the SNR. Measurements of the received signal level and the SNR may be determined in a wireless device as part of the general operations of the device and may be readily accessible. The plot indicates a decision region 620 that may be utilized by the selector 604 in FIG. 6A to determine whether bit sequence decoding may be performed by the SAIC decoding path 606 or by the redundancy-based decoding path 608, for example. For example, when an average RXLEV value and an average SNR value for a particular bit sequence falls within the area in the decision region 620, the selector 604 may determine that received bit sequence decoding is to be performed by the SAIC decoding path 606. The average RXLEV value and the average SNR value may be determined over a specified burst length. For example, an average over 32 bursts, which corresponds to approximately 150 ms for GSM applications, may provide sufficient accuracy.

The intersection points 622 and 624 may be utilized to define the decision region 620. For example, intersection point 622 may correspond to the intersection of the RXLEV value B' and the SNR value A'. The intersection point 624 may correspond to the intersection of the RXLEV value B and the SNR value A. In most instances, the values of A' and B' may be determined such that the decision region 620 enables SAIC decoding for high RXLEV values and low SNR values. For example, A' may be approximately 15 dB while B' may be approximately −90 dBm. The value of A and B may vary and may be programmable. In this regard, the processor 112 in FIG. 1B may be utilized to program the value of A and B, for example. Some exemplary settings for A and B may comprise: A=15 dB and B=−90 dBm; A=15 dB and B=−95 dBm; and A=0 dB and B=−100 dBm.

Figure 6C:
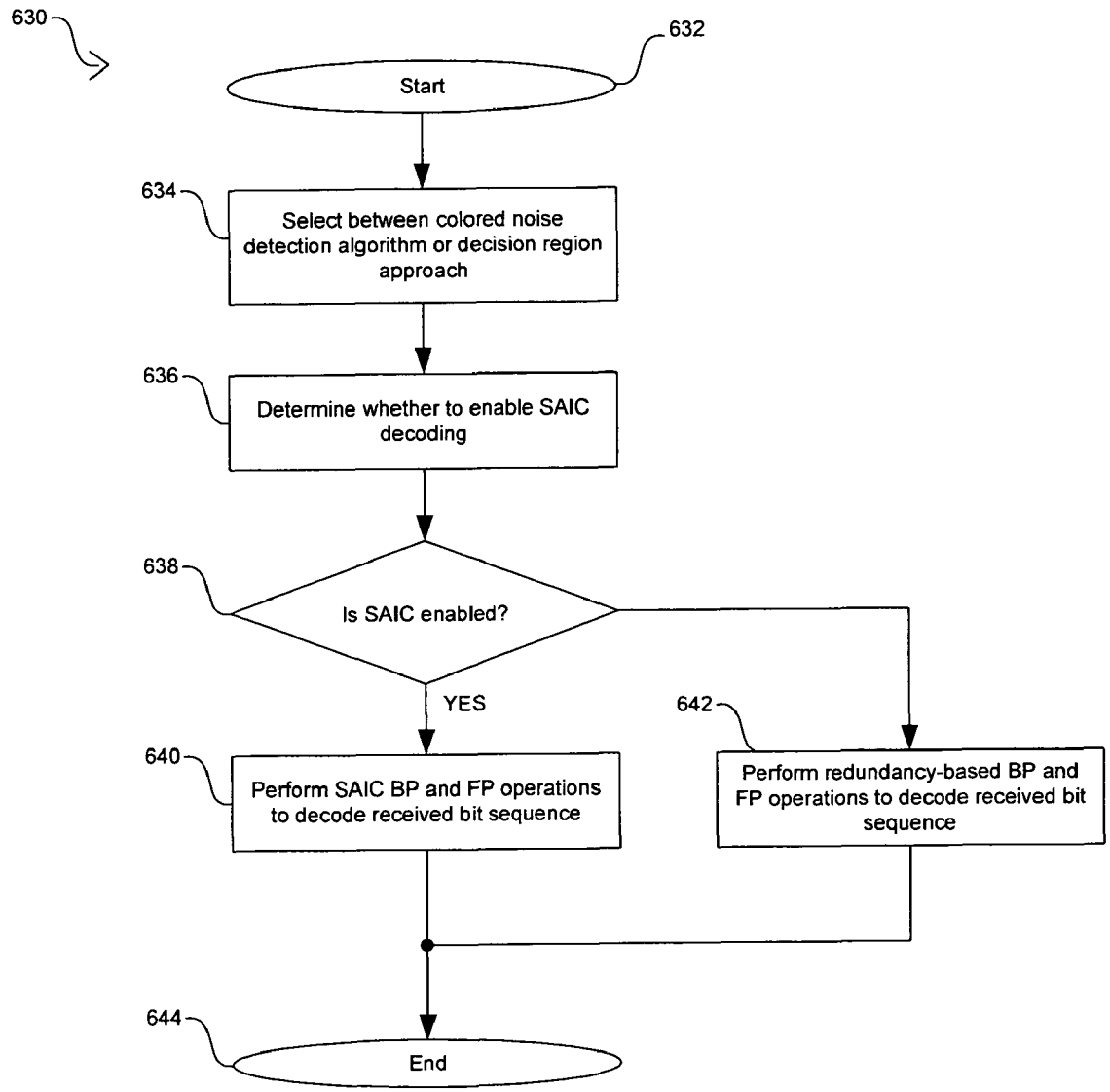
FIG. 6C is a flow diagram illustrating exemplary steps in the operation of the adaptation that selects between SAIC and redundancy-based decoding algorithms, in accordance with an embodiment of the invention.

FIG. 6C is a flow diagram illustrating exemplary steps in the operation of the adaptation that selects between SAIC and redundancy-based decoding algorithms, in accordance with an embodiment of the invention. Referring to FIG. 6C, after start step 632, in step 634, the noise and interference detector 602 in FIG. 6A may be enabled to detect noise and/or interference based on a colored noise detection algorithm or based on received signal level and/or SNR as described in FIG. 6B. In step 636, the selector 604 may determine whether to perform bit sequence decoding by the SAIC decoding path 606 or by the redundancy-based decoding path 608 based on the results provided by the noise and interference detector 602. For example, when utilizing a decision region technique, the selector 604 may chose to perform bit sequence decoding based on SAIC decoding algorithms when the average RXLEV value and the average SNR value fall within the area of the decision region 620.

In step 638, when the selector 604 enables SAIC decoding, the process may proceed to step 640. In step 640, the received bit sequence may be communicated to the SAIC decoding path 606 for processing. The SAIC decoding path 606 may generate a decoded received bit sequence that may be communicated to the higher level process 410 for further processing. After step 640, the process may proceed to end step 644.

Returning to step 638, when the selector 604 does not enable SAIC decoding, the process may proceed to step 642. In step 640, the received bit sequence may be communicated to the redundancy-based decoding path 608 for processing. The redundancy-based decoding path 608 may generate a decoded received bit sequence that may be communicated to the higher level process 410 for further processing. After step 642, the process may proceed to end step 644.

The adaptation of single antenna interference cancellation and redundancy-based decoding algorithms in a single wireless receiver may provide sufficient flexibility to improve the performance of optimized receivers for decoding interdependent encoded data while also enabling the reduction of signal interference without extensive and costly increases in hardware and/or software complexity.

Some embodiments of the invention may comprise a machine-readable storage and/or a computer-readable medium having stored thereon, a computer program having at least one code section for signal processing, the at least one code section being executable by a machine and/or computer for causing the machine and/or computer to perform steps comprising: decoding a received bit sequence using a first decoding algorithm that utilizes redundancy and imposes at least one physical constraint during decoding, resulting in a first decoded received bit sequence; decoding the received bit sequence using a second decoding algorithm that utilizes single antenna interference cancellation (SAIC), resulting in a second decoded received bit sequence; and selecting one of the first decoded received bit sequence and the second decoded received bit sequence based on a generated redundancy verification parameter for each of the first decoded received bit sequence and the second decoded received bit sequence. The physical constraint may be related to a type of data for the received bit sequence. The generated redundancy verification parameter is a cyclic redundancy check (CRC). The machine-readable storage may comprise code for performing a burst process (BP) operation for the first decoding algorithm. The machine-readable storage may comprise code for performing a frame process (FP) operation for the first decoding algorithm that generates the first decoded received bit sequence. The machine-readable storage may comprise code for performing a burst process (BP) operation for the second decoding algorithm. The machine-readable storage may comprise code for performing a frame process (FP) operation for the second decoding algorithm that generates the second decoded received bit sequence.

Some embodiments of the invention may comprise a machine-readable storage and/or a computer-readable medium having stored thereon, a computer program having at least one code section for signal processing, the at least one code section being executable by a machine and/or computer for causing the machine and/or computer to perform steps comprising decoding a received bit sequence using a first decoding algorithm that utilizes single antenna interference cancellation (SAIC), resulting in a first decoded received bit sequence; if the first decoded received bit sequence is selected based on a selection parameter, transferring the first decoded received bit sequence to a higher level process for further processing; and if the first decoded received bit sequence is not selected based on the selection parameter, decoding the received bit sequence using a second decoding algorithm that utilizes redundancy and imposes at least one physical constraint during decoding, resulting in a second decoded received bit sequence and transferring the second decoded received bit sequence to the higher level process for further processing. The selection parameter may be a generated redundancy verification parameter for the first decoded received bit sequence. The selection parameter may be a signal-to-noise ratio (SNR) for the first decoded received bit sequence. The selection parameter may be a received signal level, RXLEV.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising: performing, by one or more processors and/or circuits:
    decoding a received bit sequence using a first decoding algorithm that utilizes redundancy and imposes at least one physical constraint during decoding, resulting in a first decoded received bit sequence;
    decoding said received bit sequence using a second decoding algorithm that utilizes single antenna interference cancellation (SAIC), resulting in a second decoded received bit sequence; and
    selecting one of said first decoded received bit sequence and said second decoded received bit sequence based on a generated redundancy verification parameter for each of said first decoded received bit sequence and said second decoded received bit sequence.

2. The method according to claim 1, wherein said physical constraint is related to a type of data for said received bit sequence.

3. The method according to claim 1, wherein said generated redundancy verification parameter is a cyclic redundancy check (CRC).

4. The method according to claim 1, comprising performing a burst process (BP) operation for said first decoding algorithm.

5. The method according to claim 4, comprising performing a frame process (FP) operation for said first decoding algorithm that generates said first decoded received bit sequence.

6. The method according to claim 1, comprising performing a burst process (BP) operation for said second decoding algorithm.

7. The method according to claim 6, comprising performing a frame process (FP) operation for said second decoding algorithm that generates said second decoded received bit sequence.

8. A computer-readable medium having stored thereon, a computer program having at least one code section for signal processing, the at least one code section being executable by a computer for causing the computer to perform steps comprising:
    decoding a received bit sequence using a first decoding algorithm that utilizes redundancy and imposes at least one physical constraint during decoding, resulting in a first decoded received bit sequence;
    decoding said received bit sequence using a second decoding algorithm that utilizes single antenna interference cancellation (SAIC), resulting in a second decoded received bit sequence; and
    selecting one of said first decoded received bit sequence and said second decoded received bit sequence based on a generated redundancy verification parameter for each of said first decoded received bit sequence and said second decoded received bit sequence.

9. The computer-readable medium according to claim 8, wherein said physical constraint is related to a type of data for said received bit sequence.

10. The computer-readable medium according to claim 8, wherein said generated redundancy verification parameter is a cyclic redundancy check (CRC).

11. The computer-readable medium according to claim 8, wherein said at least one code section comprises code for performing a burst process (BP) operation for said first decoding algorithm.

12. The computer-readable medium according to claim 11, wherein said at least one code section comprises code for performing a frame process (FP) operation for said first decoding algorithm that generates said first decoded received bit sequence.

13. The computer-readable medium according to claim 8, wherein said at least one code section comprises code for performing a burst process (BP) operation for said second decoding algorithm.

14. The computer-readable medium according to claim 13, wherein said at least one code section comprises code for performing a frame process (FP) operation for said second decoding algorithm that generates said second decoded received bit sequence.

15. A system for signal processing, the system comprising:
    at least one processor that is operable to decode a received bit sequence using a first decoding algorithm that utilizes redundancy and imposes at least one physical constraint during decoding, resulting in a first decoded received bit sequence;
    said least one processor is operable to decode said received bit sequence using a second decoding algorithm that utilizes single antenna interference cancellation (SAIC), resulting in a second decoded received bit sequence; and
    said least one processor is operable to select one of said first decoded received bit sequence and said second decoded received bit sequence based on a generated redundancy verification parameter for each of said first decoded received bit sequence and said second decoded received bit sequence.

16. The system according to claim 15, wherein said physical constraint is related to a type of data for said received bit sequence.

17. The system according to claim 15, wherein said generated redundancy verification parameter is a cyclic redundancy check (CRC).

18. The system according to claim 15, wherein said least one processor is operable to perform a burst process (BP) operation for said first decoding algorithm.

19. The system according to claim 18, wherein said least one processor is operable to perform a frame process (FP) operation for said first decoding algorithm that generates said first decoded received bit sequence.

20. The system according to claim 15, wherein said least one processor is operable to perform a burst process (BP) operation for said second decoding algorithm.

21. The system according to claim 20, wherein said least one processor is operable to perform a frame process (FP) operation for said second decoding algorithm that generates said second decoded received bit sequence.

22. A method for signal processing, the method comprising:
performing by one or more processors and/or circuits:
decoding a received bit sequence using a first decoding algorithm that utilizes single antenna interference cancellation (SAIC), resulting in a first decoded received bit sequence;
if said first decoded received bit sequence is selected based on a selection parameter, transferring said first decoded received bit sequence to a higher level process for further processing; and
if said first decoded received bit sequence is not selected based on said selection parameter, decoding said received bit sequence using a second decoding algorithm that utilizes redundancy and imposes at least one physical constraint during decoding, resulting in a second decoded received bit sequence and transferring said second decoded received bit sequence to said higher level process for further processing.

23. The method according to claim 22, wherein said selection parameter is a generated redundancy verification parameter for said first decoded received bit sequence.

24. The method according to claim 22, wherein said selection parameter is a signal-to-noise ratio (SNR) for said first decoded received bit sequence.

25. The method according to claim 22, wherein said selection parameter is a received signal level, RXLEV.

26. A computer-readable medium having stored thereon, a computer program having at least one code section for signal processing, the at least one code section being executable by a computer for causing the computer to perform steps comprising:
decoding a received bit sequence using a first decoding algorithm that utilizes single antenna interference cancellation (SAIC), resulting in a first decoded received bit sequence;
if said first decoded received bit sequence is selected based on a selection parameter, transferring said first decoded received bit sequence to a higher level process for further processing; and
if said first decoded received bit sequence is not selected based on said selection parameter, decoding said received bit sequence using a second decoding algorithm that utilizes redundancy and imposes at least one physical constraint during decoding, resulting in a second decoded received bit sequence and transferring said second decoded received bit sequence to said higher level process for further processing.

27. The computer-readable medium according to claim 26, wherein said selection parameter is a generated redundancy verification parameter for said first decoded received bit sequence.

28. The computer-readable medium according to claim 26, wherein said selection parameter is a signal-to-noise ratio (SNR) for said first decoded received bit sequence.

29. The computer-readable medium according to claim 26, wherein said selection parameter is a received signal level, RXLEV.

30. A system for signal processing, the system comprising:
at least one processor that is operable to decode a received bit sequence using a first decoding algorithm that utilizes single antenna interference cancellation (SAIC), resulting in a first decoded received bit sequence;
if said first decoded received bit sequence is selected by said at least one processor based on a selection parameter, said at least one processor enables transfer of said first decoded received bit sequence to a higher level process for further processing; and
if said first decoded received bit sequence is not selected by said at least one processor based on said selection parameter, said at least one processor enables decoding of said received bit sequence using a second decoding algorithm that utilizes redundancy and imposes at least one physical constraint during decoding, resulting in a second decoded received bit sequence and said at least one processor enables transfer of said second decoded received bit sequence to said higher level process for further processing.

31. The system according to claim 30, wherein said selection parameter is a generated redundancy verification parameter for said first decoded received bit sequence.

32. The system according to claim 31, wherein said selection parameter is a signal-to-noise ratio (SNR) for said first decoded received bit sequence.

33. The system according to claim 32, wherein said selection parameter is a received signal level, RXLEV.

* * * * *